(12) United States Patent
Jakimov et al.

(10) Patent No.: US 8,176,777 B2
(45) Date of Patent: May 15, 2012

(54) DEVICE AND METHOD FOR MEASURING LAYER THICKNESSES

(75) Inventors: Andreas Jakimov, Munich (DE); Manuel Hertter, Munich (DE); Stefan Schneiderbanger, Lauterbach (DE)

(73) Assignee: MTU Aero Engines GmbH, Munich (DE)

( * ) Notice: Subject to any disclaimer, the term of this patent is extended or adjusted under 35 U.S.C. 154(b) by 379 days.

(21) Appl. No.: 12/513,584

(22) PCT Filed: Oct. 30, 2007

(86) PCT No.: PCT/DE2007/001945
§ 371 (c)(1),
(2), (4) Date: May 5, 2009

(87) PCT Pub. No.: WO2008/055473
PCT Pub. Date: May 15, 2008

(65) Prior Publication Data
US 2010/0077849 A1    Apr. 1, 2010

(30) Foreign Application Priority Data

Nov. 8, 2006   (DE) .......................... 10 2006 052 587

(51) Int. Cl.
*G01B 21/08* (2006.01)
(52) U.S. Cl. .................................................. 73/150 A
(58) Field of Classification Search ................ 73/150 A, 73/150 R
See application file for complete search history.

(56) References Cited

U.S. PATENT DOCUMENTS

| | | | |
|---|---|---|---|
| 4,276,480 A | | 6/1981 | Watson |
| 4,977,853 A | * | 12/1990 | Falcoff et al. ................. 118/665 |
| 5,062,298 A | * | 11/1991 | Falcoff et al. ................... 73/597 |
| 5,661,250 A | * | 8/1997 | Katahira et al. ............. 73/865.8 |
| 2005/0073694 A1 | | 4/2005 | King et al. |
| 2005/0173259 A1 | * | 8/2005 | Mavliev et al. ............... 205/645 |
| 2008/0204723 A1 | * | 8/2008 | Sekine et al. ................... 356/73 |

FOREIGN PATENT DOCUMENTS

| | | |
|---|---|---|
| DE | 44 25 187 A1 | 1/1996 |
| DE | 10 2005 009262 A1 | 8/2006 |
| EP | 0 422 545 A | 4/1991 |

OTHER PUBLICATIONS

PCT Application No. PCT/DE2007/001945, International Search Report and Written Opinion, Feb. 11, 2008.

* cited by examiner

*Primary Examiner* — Max Noori
(74) *Attorney, Agent, or Firm* — Howison & Arnott, L.L.P.

(57) ABSTRACT

The present invention concerns a device for measuring of layer thicknesses, especially for measuring of layer thicknesses of a structural part (18) during or after a coating process, with at least a first and a second path length measuring device (12, 14), wherein a first path length (a) to a surface (20) of a layer (22) being applied to the structural part (18) is measured by means of the first path length measuring device (12) and a second path length (b) to an uncoated surface (24) of the structural part (18) is measured by means of the second path length measuring device (14) continuously or at predetermined moments of time. According to the invention, the device (10) furthermore comprises at least a third path length measuring device (16) for measuring and monitoring the position of the first path length measuring device (12) relative to the structural part (18), wherein a third path length (c) is measured by the third path length measuring device (16) to determine the position of the structural part (18) continuously or at predetermined moments of time. The invention furthermore involves a method for measuring of layer thicknesses, especially for measuring of layer thicknesses of a structural part (18) during or after a coating process.

20 Claims, 2 Drawing Sheets circumferential direction

DEVICE AND METHOD FOR MEASURING LAYER THICKNESSES

CROSS-REFERENCE TO RELATED APPLICATIONS

This application is a U.S. National Phase application submitted under 35 U.S.C. §371 of Patent Cooperation Treaty application serial no. PCT/DE2007/001945, filed Oct. 30, 2007, and entitled DEVICE AND METHOD FOR MEASURING LAYER THICKNESSES, which application claims priority to German patent application serial no. DE 10 2006 052 587.6, filed Nov. 8, 2006, and entitled VORRICHTUNG UND VERFAHREN ZUM MESSEN VON SCHICHTDICKEN, the specifications of which are incorporated herein by reference in their entireties.

TECHNICAL FIELD

The present invention concerns a device for measuring of layer thicknesses, especially for measuring of layer thicknesses of a structural part during or after a coating process, with at least a first and a second path length measuring device, wherein a first path length to a surface of a layer being applied to the structural part is measured by means of the first path length measuring device and a second path length to an uncoated surface of the structural part is measured by means of the second path length measuring device continuously or at predetermined moments of time. The invention further concerns a method for measuring of layer thicknesses, especially for measuring of layer thicknesses of a structural part during or after a coating process, wherein a first path length to a surface of a layer being applied to the structural part is measured by means of the first path length measuring device and a second path length to an uncoated surface of the structural part is measured by means of the second path length measuring device continuously or at predetermined moments of time.

BACKGROUND

In the coating of structural parts, especially by means of thermal coating methods such as flame spraying, plasma spraying, etc., the thickness of the layer being applied is generally determined after the completion of the coating process. In this case, the layer thickness distribution and the texture of such layers is determined by a polished section analysis of a process control sample. The drawback here is that the layer thickness is always determined only on the mentioned process control sample and not on the actual structural part. This leads to inaccuracies in the determination of the layer thickness. If, furthermore, it is found that the layer thickness is to low, for example, further spraying must be done for the corresponding layer. In many applications, this is not possible, so that the entire coating has to be removed from the part once more and be reapplied. These methods are naturally costly and time-consuming and furthermore constitute a prolonging of the time to produce the coated structural parts.

To overcome these disadvantages, DE 44 25 187 A1 proposes a device and a method for measuring of layer thicknesses of the aforementioned kind. Here, the layer thickness or the layer thickness distribution is measured directly on the structural part immediately during or after the coating process. For this, two path length measuring devices are used, using laser triangulation on the one hand to measure the diminishing distance between the surface of the layer being applied and a first path length measuring device. On the other hand, a second path length measuring device is used to determine the distance of this device from an uncoated reference surface of the structural part. In this way, one can allow for measurement inaccuracies, such as those caused by expansion of the structural part due to the heat of the coating process. The reference surface can be, for example, the uncoated back side of the structural part. With the known device and the corresponding known method it is possible to measure the thickness of the sprayed-on layer with an accuracy in the micron range.

The problem of the present invention is to provide a device of the aforementioned kind that leads to a further improvement of the measurement accuracy compared to the known devices.

A further problem of the present invention is to provide an aforementioned method that has a higher measurement accuracy than the known measurement methods.

SUMMARY

These problems are solved by a device according to the features of one aspect, as well as a method according to the features of another aspect.

Advantageous embodiments of the invention are described in the particular subclaims.

One device according to the invention for measuring of layer thicknesses, especially for measuring of layer thicknesses of a structural part during or after a coating process, has at least a first and a second path length measuring device, wherein a first path length (a) to a surface of a layer being applied to the structural part is measured by means of the first path length measuring device and a second path length (b) to an uncoated surface of the structural part is measured by means of the second path length measuring device continuously or at predetermined moments of time. According to the invention, the device comprises at least a third path length measuring device for measuring and monitoring the position of the first path length measuring device relative to the structural part, wherein a third path length (c) is measured by the third path length measuring device to determine the position of the structural part continuously or at predetermined moments of time. In this way, one can ascertain with very great accuracy precisely where the first path length measuring device is measuring. In particular, in the case of structural parts having rotational symmetry, movements of the structural part relative to the first path length measuring device can occur, which can result in inaccuracies when determining the position of the first path length measuring device and, thus, inaccuracies in determining the thickness of a layer at a corresponding point of the structural part. Thus, advantageously, not only a very great accuracy in determining the layer thickness or the layer thickness distribution becomes possible, but also a very high measurement accuracy with regard to determining the position of the measured layer thickness. Therefore, one can make exact statements as to the layer thickness distribution over the entire layer applied to the structural part. The first, second and third path length measuring device can be configured as an optical and/or acoustical path length measuring device. In particular, laser path length measuring devices are used as the first, second and third path length measuring devices. But it is also possible to measure the path lengths by means of ultrasound or comparable methods.

In another advantageous embodiment of the invention, at least the first path length measuring device can swivel. This makes it possible to measure undercuts on the structural part or the layer applied to the structural part. In this case, the first path length measuring device can be adjusted at defined angles α or α'.

In a second advantageous embodiment of the invention, the first, second and third path length measuring devices are arranged on a rail system. This makes it possible to position the path length measuring devices at predetermined distances and angles from each other. In this case, the path length measuring devices can be arranged to travel on the rail system. Furthermore, it is possible to configure the rail system itself able to travel. Moreover, according to another advantageous embodiment of the invention, the measurement of the first and second path lengths (a, b) occurs approximately perpendicular to the measurement of the third path length (c). In this way, it is possible to measure movements of the structural part itself in two directions (x, y) and factor these into the determination of the layer thickness.

A method according to the invention for measuring of layer thicknesses, especially for measuring of layer thicknesses of a structural part during or after a coating process, comprises the measurement of a first path length (a) to a surface of a layer being applied to the structural part by means of a first path length measuring device and the measurement of a second path length (b) to an uncoated surface of the structural part by means of a second path length measuring device. The measurements can occur continuously or at predetermined moments of time. According to the invention, the position of the first path length measuring device relative to the structural part is measured and monitored by means of a third path length measuring device, for which a third path length (c) is measured to determine the position of the structural part continuously or at predetermined moments of time. In this way, it is advantageously possible to determine where precisely the first path length measuring device is measuring. The knowledge of the exact measurement point leads to a very high precision in the determination of the layer thickness distribution of the layer applied to the structural part. Furthermore, movements of the structural part itself during or after the coating process can be factored into the determination or calculation of the exact layer thickness. This also leads to an enhanced measurement accuracy in the determination of layer thicknesses. With the synchronously determined measurement values of the three path length measuring devices, one can determine cross sectional profiles of the structural part before and after the coating, which when related to each other allow one to determine the layer thickness distribution with very high accuracy.

Optical and/or acoustical path length measuring methods are used to determine the first, second and third path lengths (a, b, c). In particular, a laser triangulation method can be used, as is described in DE 44 25 187 A1, for example.

In another advantageous embodiment of the method of the invention, the first path length measuring device can swivel in order to measure undercuts on the surface of the layer being measured. Thanks to allowing at least the first path length measuring device to swivel, one can determine exact layer thicknesses or layer thickness distributions for special structural parts having layer thickness distributions which do not allow for a correct measurement with a rigid fastening of a path length measuring device, due to undercuts.

In another advantageous embodiment of the method of the invention, the measurement of the first and second path lengths (a, b) occurs approximately perpendicular to the measurement of the third path length (c). This makes it possible also to allow for movements of the structural part itself during or after the coating when determining or calculating the layer thickness or layer thickness distribution, and thus to measure in two directions of motion approximately perpendicular to each other.

In another advantageous embodiment of the method of the invention, the thicknesses of the layer or the layer thickness distribution are calculated and determined from the measured path lengths (a, b, c) by means of a data processing system. The distance data determined by the three path length measuring devices are related to each other so that it is possible to determine a layer thickness relative to a single measurement point or a layer thickness distribution for the applied layer with very high precision in the micron range.

BRIEF DESCRIPTION OF THE DRAWINGS

Further benefits, features and details of the invention will result from the following specification of a sample embodiment, shown in a drawing. This shows.

DETAILED DESCRIPTION

Figure 1:
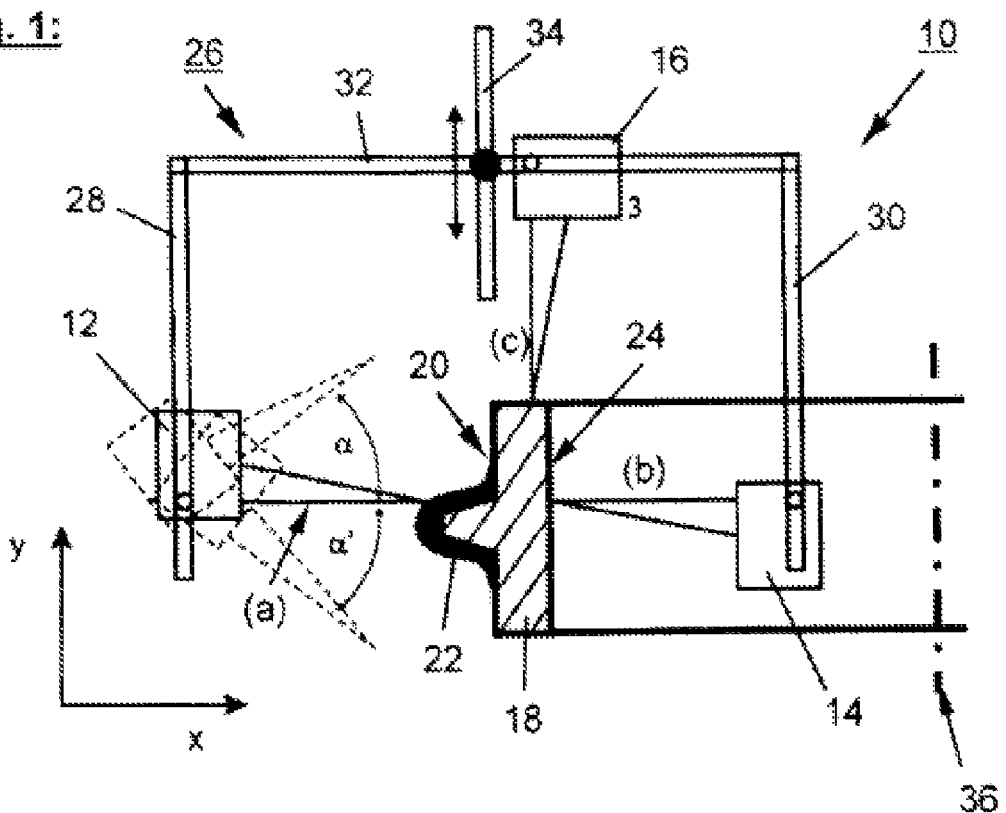
FIG. 1, a schematic representation of a sample device according to the invention.

FIG. 1 shows a schematic representation of a device 10 according to the invention for the measuring of layer thicknesses of a structural part 18 during or after a coating process. One notices that the device 10 has a first and a second path length measuring device 12, 14. A first path length (a) to a surface 20 of a layer 22 being applied to the structural part 18 is measured by means of the first path length measuring device 12. A second path length (b) to an uncoated surface 24 of the structural part 18 is determined by means of the second path length measuring device 14. The measurements can occur continuously or at predetermined moments of time. In the sample embodiment depicted, the uncoated surface 24 serving as a reference surface for the determination of the exact layer thickness distribution is arranged on the back side of the structural part 18. But it is also possible for a correspondingly uncoated surface 24 to be arranged on the front side of the structural part 18. Furthermore, it is possible to arrange an uncoated reference surface on a separate structural part, which is placed next to the actual structural part being coated.

Furthermore, one notices that the device 10 has a third path length measuring device 16 for measuring and monitoring the position of the first path length measuring device 12 relative to the structural part 18. A third path length (c) is measured by the third path length measuring device to determine the position of the structural part 18. This measurement can also occur continuously or at predetermined moments of time. In this way it is possible to determine the exact measurement position of the first path length measuring device 12. It is thus possible to cancel out measurement inaccuracies occurring, for example, due to movements of the structural part 18 itself. In the sample embodiment shown, the structural part 18 has rotational symmetry. Thanks to the third path length measuring device 16, it is possible to fix the exact axial position of one axis 36 of the structural part 18.

In FIG. 1, the path length measuring devices 12, 14, 16 are only shown schematically. The path length measuring devices 12, 14, 16 can be configured as optical and/or acoustical path length measuring devices. In particular, the path length measuring devices 12, 14, 16 can be configured as laser path length measuring devices, as is described in DE 44 25 187 A1, for example.

Furthermore, it is evident from FIG. 1 that the first path length measuring device 12 can swivel. Thus, the first path length measuring device 12 can be adjusted at defined angles α or α'. The swivel capability of the first path length measuring device 12 makes it possible to measure exactly undercuts that are formed by the configuration of the structural part 18 itself or by a corresponding application of layer thickness. The swivel capability of the first path length measuring device 12 about the angles α or α' is shown in detail in FIG. 2. One notices that due to the configuration of the structural part 18 shown in FIG. 2, undercuts occur in the layer 22 being applied, such as can only be measured exactly thanks to the swivel capability of the first path length measuring device 12.

Moreover, one notices from FIG. 1 that the device 10 consists of a rail system 26 consisting of two parallel running rails 28, 30 and one rail 32 joining the two rails 28, 30 together. The first path length measuring device 12 is arranged on the rail 28 and the second path length measuring device on rail 30. The third path length measuring device 16 is secured to the rail 32 running perpendicular to the two rails 28, 30. The path length measuring devices 12, 14, 16 can be configured so that they can travel on the respective rails 28, 30, 32. But it is also possible for the entire rail system 26 to be secured and able to travel on another rail 34, running parallel to the rails 28 and 30. The rail system 26 provides for a predetermined position of the path length measuring devices 12, 14, 16 relative to each other. The entire rail system 26 and thus the three path length measuring devices 12, 14, 16 can travel on the rail 34 without a displacement of the individual relative positions of the path length measuring devices 12, 14, 16, i.e., they can travel along the front or back side of the structural part being measured. Furthermore, thanks to the sample arrangement of the three path length measuring devices 12, 14, 16 shown in FIG. 1, the measurement of the first and second path lengths (a, b) occurs roughly perpendicular to the measurement of the third path length (c)(x, y-direction). Thus, with the synchronously determined measurements of the three path length measuring devices 12, 14, 16, one can determine cross section profiles of the structural part 18 before and after the coating, enabling a determination of the layer thickness distribution of the layer 22 with very high precision when related to each other.

Figure 2:
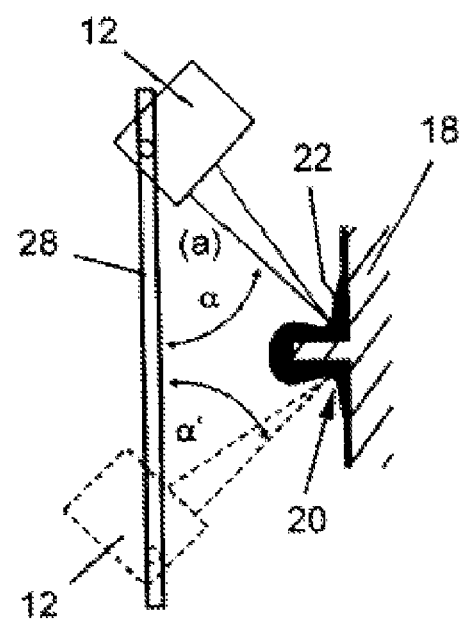
FIG. 2, a schematic representation of the sample device according to the invention, in a detail view.
Figure 3:
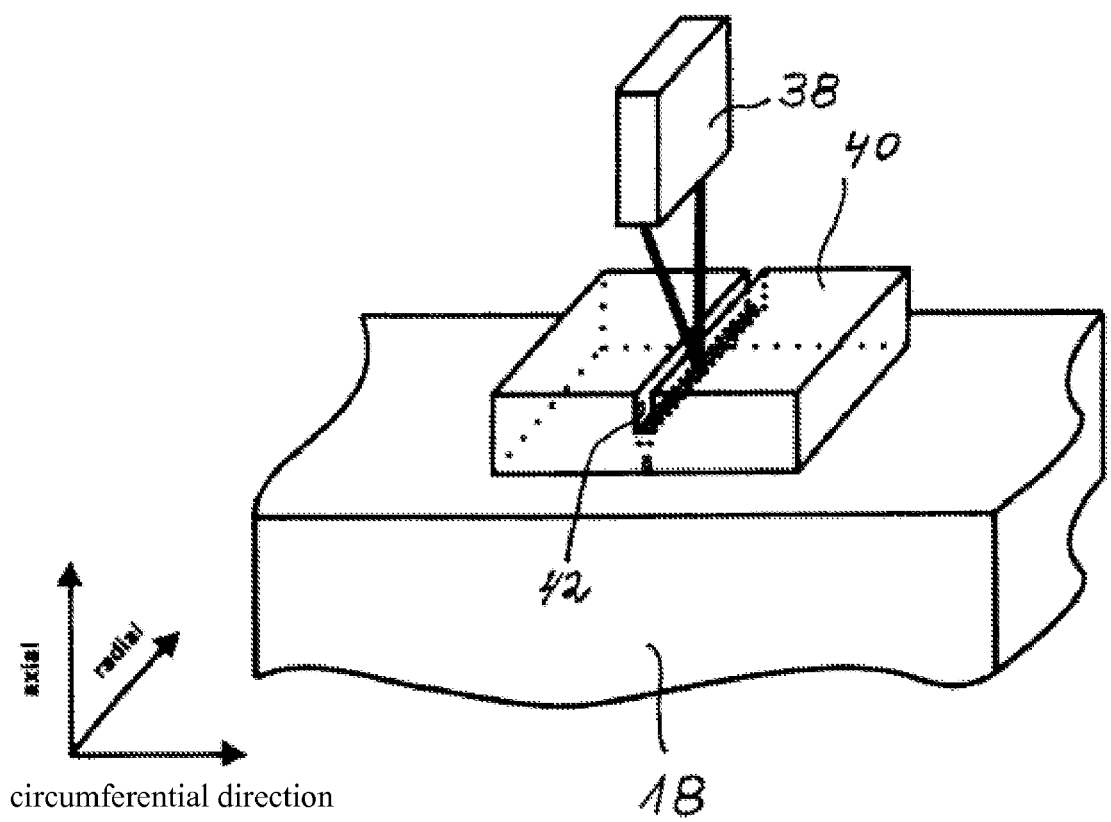
FIG. 3, a sample modified configuration of the sample embodiment according to FIGS. 1 and 2, in partial view.

FIG. 3 shows a sample modified configuration of the sample embodiment per FIGS. 1 and 2 in partial view. In particular, it shows a path length measuring device 38, which can be in particular the second path length measuring device 14 or the third path length measuring device 16 from FIG. 2 or from FIG. 2. Moreover, FIG. 3 shows a segment of the structural part 18, as well as a position block 40—unlike the case with FIGS. 1 and 2.

To allow for a measurement of the device 12 in the circumferential direction to be performed reproducibly at (essentially) the same spot of the structural part, thus guaranteeing or improving a direct comparability of the measurement values, a position block 40 is fastened to the structural part 18. This has a groove or slot with a reference surface (hatched surface, see drawing). The position block 40 is fastened on the structural part 18 so that the distance to the reference surface can be measured either by device 14 or 16. The position block 40 must be designed, or is advantageously so designed, that the distance to the reference surface is distinctly different from the distance to the surface of the structural part or the surface of the block. The slot width a is critical to the accuracy of the position. However, it should not be smaller than the measuring beam of the laser.

The invention claimed is:

1. A measuring apparatus for measuring the thickness of a layer coating a first surface of a structural part, the structural part further having a second surface that is uncoated, the apparatus comprising:
   a first path length measuring device adapted to measure a first path length to a surface of the layer coating the first surface of the structural part;
   a second path length measuring device adapted to measure a second path length to the uncoated second surface of the structural part;
   at least a third path length measuring device adapted to measure a third path length determinative of a position of the structural part that is indicative of a measurement point on the surface of the layer at which point the first path length measuring device is measuring the first path length.

2. A measuring apparatus in accordance with claim 1, wherein the third path length measuring device is adapted to measure the third path length continuously over time during operation.

3. A measuring apparatus in accordance with claim 1, wherein the third path length measuring device is adapted to measure the third path length at discrete predetermined moments of time during operation.

4. A measuring apparatus in accordance with claim 1, wherein the first, second and third path length measuring devices are optical path length measuring devices.

5. A measuring apparatus in accordance with claim 4, wherein the optical path length measuring devices are laser path length measuring devices.

6. A measuring apparatus in accordance with claim 1, wherein the first, second and third path length measuring devices are acoustical path length measuring devices.

7. A measuring apparatus in accordance with claim 1, wherein at least the first path length measuring device can swivel.

8. A measuring apparatus in accordance with claim 1, wherein the first, second and third path length measuring devices are arranged on a rail system.

9. A measuring apparatus in accordance with claim 8, wherein the first, second and third path length measuring devices are arranged to travel to different positions on the rail system.

10. A measuring apparatus in accordance with claim 8, wherein the rail system is able to travel relative to the structural part.

11. A measuring apparatus in accordance with claim 1, wherein during measurement of the first, second and third path lengths, the first and second path lengths are oriented approximately perpendicular to the third path length.

12. A method for measuring the thickness of a layer coating a first surface of a structural part, the structural part further having a second surface that is uncoated, the method comprising the following steps:
   measuring a first path length to a surface of the layer coating the first surface of the structural part using a first path length measuring device;
   measuring a second path length to the uncoated second surface of the structural part using a second path length measuring device; and
   measuring a third path length determinative of a position of the structural part that is indicative of a measurement point on the surface of the layer at which point the first path length measuring device is measuring the first path length.

13. A method for measuring in accordance with claim 12, wherein the step of measuring a third path length is performed continuously over time during operation.

14. A method for measuring in accordance with claim 12, wherein the step of measuring a third path length is performed at discrete predetermined moments of time during operation.

15. A method for measuring in accordance with claim 12, wherein the steps of measuring the first, second and third path lengths are performed using one of optical and acoustical path length measurement.

16. A method for measuring in accordance with claim 15, wherein the steps of measuring the first, second and third path lengths utilize laser triangulation.

17. A method for measuring in accordance with claim 12, wherein the step of measuring the first path length includes measuring undercuts on the surface of the layer coating the first surface using a first path length measuring device that can swivel.

18. A method for measuring in accordance with claim 12, wherein during measurement of the first, second and third path lengths, the first and second path lengths are oriented approximately perpendicular to the third path length.

19. A method for measuring in accordance with claim 12, further comprising the step of calculating the thicknesses of the layer coating the first surface from the measured first, second and third path lengths using a data processing system.

20. A method for measuring the thickness of a layer coating a first surface of a structural part of a turbine during a thermal coating process, the structural part further having a second surface that is uncoated, the method comprising the following steps:

a) measuring, before the thermal coating, an initial first path length to the first surface of the structural part of a turbine using a first path length measuring device;
b) measuring, before the thermal coating, an initial second path length to the uncoated second surface of the structural part using a second path length measuring device;
c) measuring, before the thermal coating, an initial third path length determinative of the position of the structural part and indicative of the position of the first path length measuring device relative to the structural part using a third path length measuring device;
d) thermally applying a layer coating the first surface of the structural part;
e) measuring, after the thermal coating, a subsequent first path length to a surface of the thermally-applied layer coating the first surface of the structural part using the first path length measuring device;
f) measuring, after the thermal coating, a subsequent second path length to the uncoated second surface of the structural part using the second path length measuring device;
g) measuring, after the thermal coating, a subsequent third path length determinative of the position of the structural part and indicative of the position of the first path length measuring device relative to the structural part using the third path length measuring device; and
h) calculating the thicknesses of the thermally-applied layer from the measured initial first, second and third path lengths and the measured subsequent first, second and third path lengths.

* * * * *